(12) United States Patent
Wang et al.

(10) Patent No.: US 11,754,480 B2
(45) Date of Patent: Sep. 12, 2023

(54) ROLLING TEST DEVICE AND METHOD

(71) Applicant: HKC CORPORATION LIMITED, Guangdong (CN)

(72) Inventors: Huaishan Wang, Guangdong (CN); Jin Li, Guangdong (CN); Lidan Ye, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 259 days.

(21) Appl. No.: 17/181,153

(22) Filed: Feb. 22, 2021

(65) Prior Publication Data

US 2022/0034774 A1 Feb. 3, 2022

(30) Foreign Application Priority Data

Jul. 28, 2020 (CN) .......................... 202010749136.8

(51) Int. Cl.
*G01N 3/08* (2006.01)

(52) U.S. Cl.
CPC ....... *G01N 3/08* (2013.01); *G01N 2203/0003* (2013.01); *G01N 2203/0019* (2013.01); *G01N 2203/0202* (2013.01); *G01N 2203/0282* (2013.01)

(58) Field of Classification Search
CPC ............. G01N 3/08; G01N 2203/0003; G01N 2203/0019; G01N 2203/0202; G01N 2203/0282
See application file for complete search history.

(56) References Cited

FOREIGN PATENT DOCUMENTS

| CN | 1558203 | A |   | 12/2004 |
|----|---------|---|---|---------|
| CN | 1716003 | A |   | 1/2006  |
| CN | 105259048 | A |   | 1/2016  |
| CN | 106790896 | A |   | 5/2017  |
| CN | 107193139 | A |   | 9/2017  |
| CN | 109991767 | A |   | 7/2019  |
| CN | 210719993 | U | * | 6/2020  |
| CN | 210719993 | U |   | 6/2020  |

OTHER PUBLICATIONS

Chinese Office Action dated Nov. 19, 2021, for Hui ke co., ltd., Chinese Application No. 2020107491368, filed Jul. 28, 2020.
Chinese Office Action dated Aug. 31, 2021, for Hui ke co., ltd., Chinese Application No. 2020107491368, filed Jul. 28, 2020.

* cited by examiner

*Primary Examiner* — Jamel E Williams
(74) *Attorney, Agent, or Firm* — Law Offices of Albert Wai-Kit Chan, PLLC

(57) ABSTRACT

Disclosed are a rolling test device and a rolling test method. The rolling test device includes a test platform having a rolling surface for placing a test piece to be rolled; a rolling jig located on one side of the rolling surface; and a driving member connected to the rolling jig. A roller is connected to one end of the rolling jig towards the rolling surface, and after the roller is pressed against the rolling surface, the driving member drives the rolling jig to move on the rolling surface to drive the roller to perform a rolling test on the rolling surface.

15 Claims, 6 Drawing Sheets

ROLLING TEST DEVICE AND METHOD

CROSS-REFERENCE TO RELATED APPLICATIONS

This application claims priority to Chinese Application No. 202010749136.8, filed on Jul. 28, 2020, the entire disclosure of which is incorporated herein by reference.

TECHNICAL FIELD

The present disclosure relates to the technical field of pressure testing, and in particular to a rolling test device and a rolling test method.

BACKGROUND

The statements here only provide background information related to the present disclosure, and do not necessarily constitute prior art.

When testing the edge of the display panel, firstly, the edge of the display panel is divided into multiple stress test points, and then each test point is tested through the pressure testing device. This test method requires a period of time for each test point, which results in a long test cycle and low efficiency.

SUMMARY

The main objective of the present disclosure is to provide a rolling test device and method, which solves the problems of long test cycle and low efficiency for testing the edge of the display panel.

In order to achieve the above objective, the present disclosure provides a rolling test device, including:

a test platform having a rolling surface for placing a test piece to be rolled;

a rolling jig located on one side of the rolling surface; and a driving member connected to the rolling jig;

a roller is connected to one end of the rolling jig towards the rolling surface, and after the roller is pressed against the rolling surface, the driving member drives the rolling jig to move on the rolling surface to drive the roller to perform a rolling test on the rolling surface.

In an embodiment, a rolling direction of the roller is parallel to a first direction.

In an embodiment, the rolling test device further includes a backlight source for illuminating the test piece to be rolled.

In an embodiment, the rolling jig includes a connecting plate, a mounting seat and a cardan shaft; the mounting seat is movably connected to the connecting plate through the cardan shaft; an output end of the driving member is connected to one end of the connecting plate away from the mounting seat; and the roller is connected to one end of the mounting seat away from the connecting plate.

In an embodiment, the driving member is a stepping motor.

In an embodiment, the rolling test device further includes a protective member between the roller and the rolling surface.

In an embodiment, the protective member is a rubber gasket.

In an embodiment of the present disclosure, the rolling test device includes a test platform, a rolling jig, and a driving member. The test platform has a rolling surface for placing a test piece to be rolled. The rolling jig is located on one side of the rolling surface. A roller is connected to one end of the rolling jig towards the rolling surface. After the roller is pressed against the rolling surface, the driving member drives the rolling jig to move on the rolling surface to drive the roller to perform a rolling test on the rolling surface. As such, in technical solutions of the present disclosure, the test piece to be rolled is placed on the rolling surface of the test platform, such that the roller is pressed against the test piece to be rolled to perform a reciprocating rolling test on the test piece to be rolled, thereby reducing the test cycle and improving the test efficiency.

In order to achieve the above objective, the present disclosure further provides a rolling test method, including the following operations:

controlling a driving member to drive a rolling jig to move to a rolling surface of a test platform; and controlling a roller of the rolling jig to perform a rolling test on the rolling surface after the roller is pressed against the rolling surface.

In an embodiment, after the operation of controlling a roller of the rolling jig to perform a rolling test on the rolling surface after the roller is pressed against the rolling surface, the rolling test method further includes:

obtaining a real-time pressure exerted by the roller on the rolling surface;

determining whether the real-time pressure is beyond a preset pressure range; and controlling the driving member to drive the rolling jig away from the rolling surface if the real-time pressure is beyond the preset pressure range.

In an embodiment, after the operation of controlling a roller of the rolling jig to perform a rolling test on the rolling surface after the roller is pressed against the rolling surface, the rolling test method further includes:

controlling the driving member to drive the rolling jig to roll on the rolling surface for a preset number of times.

In an embodiment of the present disclosure, the rolling test method includes controlling a driving member to drive a rolling jig to move to a rolling surface of a test platform; and controlling a roller of the rolling jig to perform a rolling test on the rolling surface after the roller is pressed against the rolling surface. As such, in technical solutions of the present disclosure, the test piece to be rolled is placed on the rolling surface of the test platform, such that the roller is pressed against the test piece to be rolled to perform a reciprocating rolling test on the test piece to be rolled, thereby reducing the test cycle and improving the test efficiency.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

Figure 1:
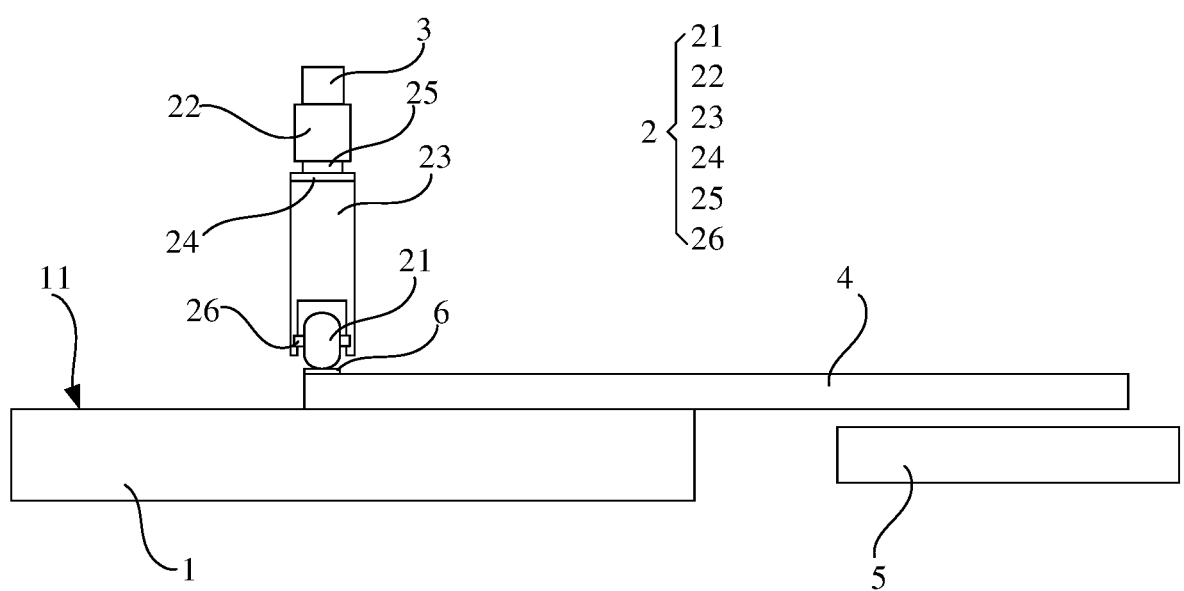
FIG. 1 is a schematic structural diagram of a rolling test device according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

Figure 2:
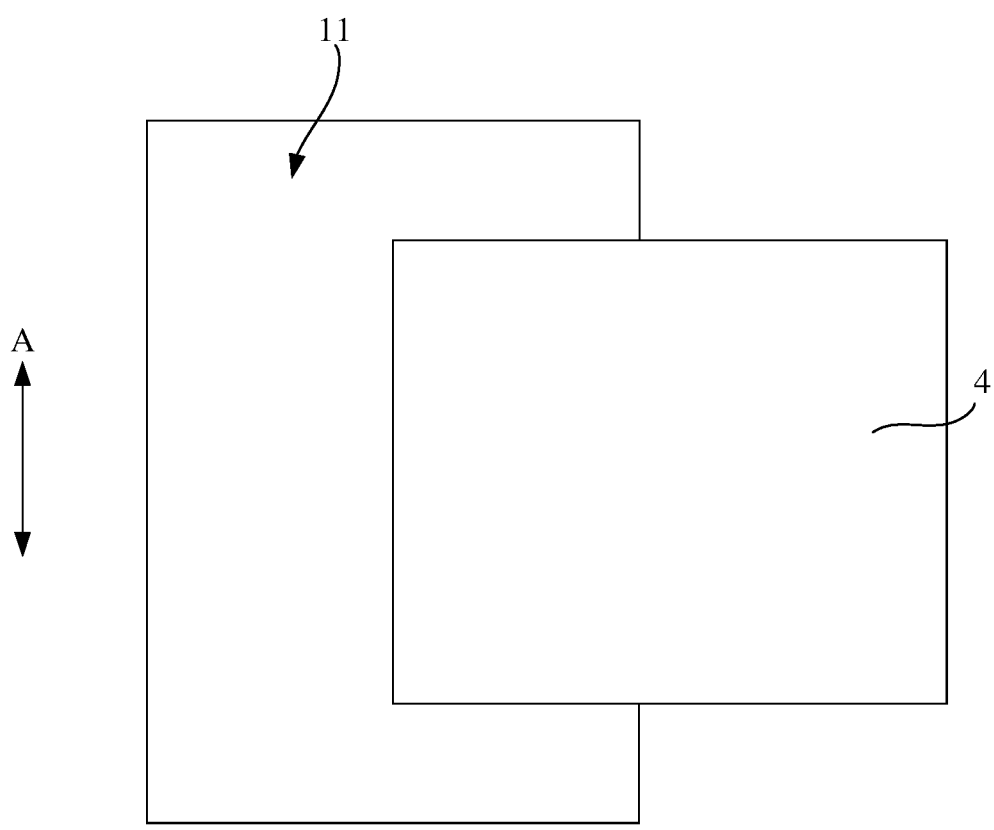
FIG. 2 is a schematic diagram of the cooperation between a test piece to be rolled and a test platform according to an embodiment of the present disclosure.
Figure 3:
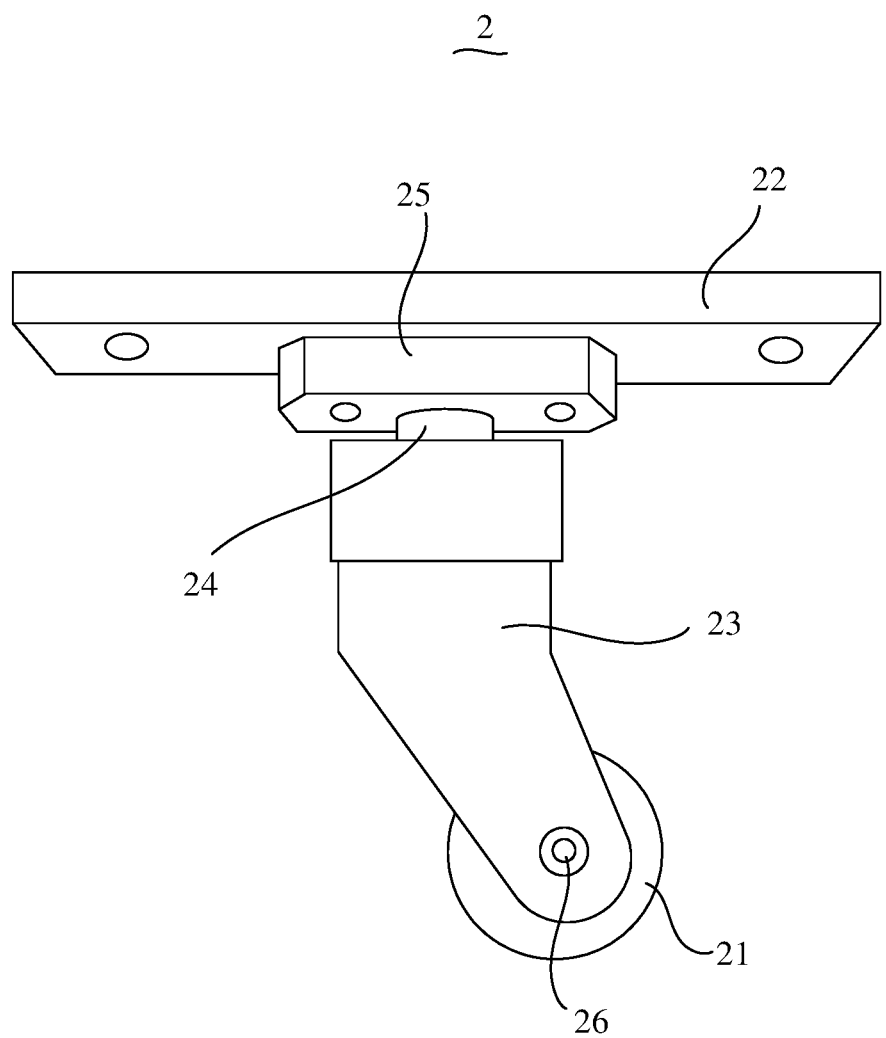
FIG. 3 is a schematic structural diagram of a rolling jig according to an embodiment of the present disclosure.

As shown in FIG. 1 to FIG. 3, the present disclosure provides a rolling test device.

In an embodiment, the rolling test device of the present disclosure is used to test a pressure limit value of an edge area of a display panel, that is, test a limit value of a line in the edge area of the display panel to resist pressure. The rolling test device can perform cyclic testing on the edge area of the display panel, so as to quickly obtain the limit value of the rolling test device to resist pressure, which can reduce the test cycle and improve the test efficiency. The display panel is a Gate Driver Less (GDL) panel.

In an embodiment, as shown in FIG. 1, the rolling test device includes a test platform 1, a rolling jig 2, and a driving member 3. The test platform 1 has a rolling surface 11 for placing a test piece 4 to be rolled. The rolling jig 2 is located on one side of the rolling surface 11. The driving member 3 is connected to the rolling jig 2. A roller 21 is connected to one end of the rolling jig 2 towards the rolling surface 11. After the roller 21 is pressed against the rolling surface 11, the driving member 3 drives the rolling jig 2 to move on the rolling surface 11 to drive the roller 21 to perform a rolling test on the rolling surface 11.

In an embodiment, the test piece 4 to be rolled is a display panel. The display panel is placed on the rolling surface 11 of the test platform 1. The test piece 4 to be rolled is located between the rolling jig 2 and the test platform 1, that is, between the roller 21 and the rolling surface 11, such that the roller 21 can move on the test piece 4 to be rolled. That is, when the roller 21 is pressed against the test piece 4 to be rolled, the driving member 3 drives the rolling jig 2 to move on the test piece 4 to be rolled to drive the roller 21 to move on the test piece 4 to be rolled, thereby performing the rolling test on the test piece 4 to be rolled.

In an embodiment, since the roller 21 is provided at the end of the rolling jig 2 towards the rolling surface 11, when the test piece 4 to be rolled is placed on the rolling surface 11 and fixed in position, the driving member 3 drives the rolling jig 2 to move to the rolling surface 11, so that the roller 21 is pressed against the rolling surface 11, that is, the roller 21 is pressed against the test area of the test piece 4 to be rolled. In the present disclosure, the test area is an edge area of the test piece 4 to be rolled, that is, the edge area of the display panel. A pressure value is applied to the rolling jig 2 such that the roller 21 is pressed against the edge area of the test piece 4 to be rolled with the pressure value. The driving member 3 drives the rolling jig 2 to move on the edge area of the test piece 4 to be rolled to drive the roller 21 to perform a rolling test on the edge area of the test piece 4 to be rolled, thereby obtaining the limit value of the edge area of the test piece 4 to be rolled to resist pressure.

In an embodiment, the pressure value is between 2 kg and 40 kg. The pressure value can be set according to specific needs, such as: 10 kg, 15 kg, etc. The pressure value is between 2 kg and 40 kg, so that the limit value of the edge area of the test piece 4 to be rolled can be obtained without damaging the structure of the test piece 4 to be rolled.

In an embodiment, the pressure value can be set by the pressure structure (not shown). That is, the pressing mechanism applies the required pressure value to the rolling jig 2 and applies the pressure value to the test piece 4 to be rolled through the roller 21 to realize the rolling test of the test piece 4 to be rolled. The roller 21 can be rolled back and forth on the test piece 4 to be rolled. That is, the roller 21 can be rolled multiple times on the test piece 4 to be rolled, and a starting position of the roller 21 to an end position of the test piece 4 to be rolled is one rolling of the roller 21. It is understandable that the pressure value of the roller 21 on the test piece 4 to be rolled is different each time. That is, the pressure value changes at any time with the increase of a rolling number of the roller 21. The change can be that the pressure value applied by the roller 21 increases with the increase of the rolling number of the roller 21. For example, the pressure value of the first rolling of the roller 21 is 2 kg, the pressure value of the second rolling is 4 kg, and the pressure value of the third rolling is 6 kg, until the limit value of the edge area of the test piece 4 to be rolled to resist pressure is obtained. However, in other embodiments, there may be other pressure changing rules, which are not limited in the present disclosure.

In an embodiment, in order to protect the structure of the test piece 4 to be rolled, after obtaining the limit value of the edge area of the test piece 4 to be rolled to resist pressure, the driving member 3 drives the rolling jig 2 to move away from the test piece 4 to be rolled. When the roller 21 is separated from the test piece 4 to be rolled, the driving member 3 stops running.

In an embodiment of the present disclosure, the rolling test device includes a test platform 1, a rolling jig 2, and a driving member 3. The test platform 1 has a rolling surface 11 for placing a test piece 4 to be rolled. The rolling jig 2 is located on one side of the rolling surface 11. A roller 21 is connected to one end of the rolling jig 2 towards the rolling surface 11. After the roller 21 is pressed against the rolling surface 11, the driving member 3 drives the rolling jig 2 to move on the rolling surface 11 to drive the roller 21 to perform a rolling test on the rolling surface 11. As such, in technical solutions of the present disclosure, the test piece 4 to be rolled is placed on the rolling surface 11 of the test platform 1, such that the roller 21 is pressed against the test piece 4 to be rolled to perform a reciprocating rolling test on the test piece 4 to be rolled, thereby reducing the test cycle and improving the test efficiency.

In an embodiment, as shown in FIG. 2, a rolling direction of the roller 21 is parallel to a first direction A, that is, the roller 21 reciprocates along the first direction A on the rolling surface 11. The rolling surface 11 is rectangular. When a longer side of the rolling surface 11 is parallel to the test side of the test piece 4 to be rolled, the first direction A is parallel to the longer side of the rolling surface 11. Since the first direction A is parallel to the test side of the test piece 4 to be rolled, when the roller 21 performs a rolling test on the test side of the test piece 4 to be rolled, the rolling direction of the roller 21 is parallel to the first direction A, such that the rolling direction of the roller 21 is parallel to the test side of the test piece 4 to be rolled, which ensures that the roller 21 performs linear reciprocating motion on the test side of the test piece 4 to be rolled, so that the rolling test of the test side of the test piece 4 to be rolled can be completed.

In other embodiments, when a shorter side of the rolling surface 11 is parallel to the test side of the test piece 4 to be rolled, the first direction A is parallel to the shorter side of the rolling surface 11. Or, when the rolling surface 11 has other shapes, it is only necessary to ensure that the first direction A is parallel to the side parallel to the rolling surface 11 and the test side of the test piece 4 to be rolled, and there is no limitation here.

In an embodiment, in order to facilitate the tester to monitor the pressure condition of the edge area of the test piece 4 to be rolled in real time, the rolling test device further includes a backlight source 5, the backlight source 5 is used to illuminate the test piece 4 to be rolled. When the roller 21 is rolling back and forth on the edge area of the test piece 4 to be rolled, the tester can monitor the rolling test situation of the edge area of the test piece 4 to be rolled in real time. When the edge area of the test piece 4 to be rolled is crushed, for example, when a small crack appears in the edge area of the test piece 4 to be rolled, the pressure value applied by the roller 21 this time is the limit value of the edge area of the test piece 4 to be rolled to resist pressure.

In an embodiment, the backlight source 5 is under the test piece 4 to be rolled. For example, when the rolling surface 11 of the test platform 1 is made of high light-transmitting material, the backlight source 5 is under the test platform 1. The light of the backlight source 5 can be irradiated on the test piece 4 to be rolled through the rolling surface 11, thereby illuminating the test piece 4 to be rolled, which is convenient for the tester to observe.

In an embodiment, a portion of the test piece 4 to be rolled is placed on the rolling surface 11, and another portion of the test piece 4 to be rolled extends out of the test platform 1. The backlight source 5 is under another part of the area where the test piece 4 to be rolled extends beyond the rolling surface 11, therefore, the light from the backlight source 5 can be irradiated on the test piece 4 to be rolled, thereby illuminating the test piece 4 to be rolled, which is convenient for the tester to observe.

It can be understood that the backlight source 5 is a visible light source, so that the light irradiated on the test piece 4 to be rolled is visible light rays, so that the tester can detect the pressure bearing condition of the test piece 4 to be rolled.

In an embodiment, as shown in FIG. 3, the rolling jig 2 includes a connecting plate 22, a mounting seat 23 and a cardan shaft 24. The mounting seat 23 is movably connected to the connecting plate 22 through the cardan shaft 24. An output end of the driving member 3 is connected to one end of the connecting plate 22 away from the mounting seat 23. The roller 21 is connected to one end of the mounting seat 23 away from the connecting plate 22. The connecting plate 22 is connected to the driving member 3. The mounting seat 23 is connected to the roller 21. The connecting plate 22 is movably connected to the mounting seat 23 through the cardan shaft 24. The output end of the driving member 3 is connected to the connecting plate 22 and can drive the connecting plate 22 to move, so that the mounting seat 23 and the roller 21 connected to the connecting plate 22 can be driven by the driving member 3 to move.

In an embodiment, the mounting seat 23 is movably connected to the connecting plate 22, that is, the mounting seat 23 rotates with the cardan shaft 24 as the rotation axis, the roller 21 connected to the mounting seat 23 rotates with the cardan shaft 24 as the rotation axis. When the roller 21 is driven by the driving member 3 to move to the edge area of the test piece 4 to be rolled, the position of the roller 21 can be adjusted to be on the edge area of the test piece 4 to be rolled by rotating the mounting seat 23 and the roller 21, such that the rolling direction of the roller 21 is parallel to the edge area of the test piece 4 to be rolled.

In an embodiment, the driving member 3 is a stepping motor. In other embodiments, the driving member 3 may also be other driving devices, such as an electric motor, an air cylinder, etc., which are not limited in the present disclosure.

In an embodiment, the rolling jig 2 further includes a fixing plate 25 mounted on the connecting plate 22 and the fixing plate 25 is between the cardan shaft 24 and the connecting plate 22. The fixing plate 25 is used to support the cardan shaft 24 and protect the structure of the cardan shaft 24 from being worn. The fixing plate 25 is installed on the connecting plate 22 by screws, and the cardan shaft 24 is connected to the fixing plate 25, that is, the cardan shaft 24 is connected to the connecting plate 22 through the fixing plate 25.

In an embodiment, the rolling jig 2 further includes a fixing pin 26 for fixing the roller 21 on the mounting seat 23.

In an embodiment, the rolling test device further includes a protective member 6 (as shown in FIG. 1) provided between the roller 21 and the rolling surface 11, to prevent the edge area of the test piece 4 to be rolled from being instantly broken and the test piece 4 to be rolled from being destroyed when the pressure value applied by the roller 21 to the edge area of the test piece 4 to be rolled is too large.

In an embodiment, the protective member 6 is a rubber gasket. In other embodiments, the protective member 6 may be other flexible materials, such as silicone gaskets, foamed plastics, etc., which are not limited in the present disclosure.

In an embodiment, a length of the protection member 6 is equal to a length of the edge area of the test piece 4 to be rolled, and a width of the protection member 6 is equal to a thickness of the roller 21, so that the edge area of the test piece 4 to be rolled can be completely protected.

In an embodiment of the present disclosure, the rolling test device includes a test platform 1, a rolling jig 2, and a driving member 3. The test platform 1 has a rolling surface 11 for placing a test piece 4 to be rolled. The rolling jig 2 is located on one side of the rolling surface 11. A roller 21 is connected to one end of the rolling jig 2 towards the rolling surface 11. After the roller 21 is pressed against the rolling surface 11, the driving member 3 drives the rolling jig 2 to move on the rolling surface 11 to drive the roller 21 to perform a rolling test on the rolling surface 11. As such, in technical solutions of the present disclosure, the test piece 4 to be rolled is placed on the rolling surface 11 of the test platform 1, such that the roller 21 is pressed against the test piece 4 to be rolled to perform a reciprocating rolling test on the test piece 4 to be rolled, thereby reducing the test cycle and improving the test efficiency.

Figure 4:
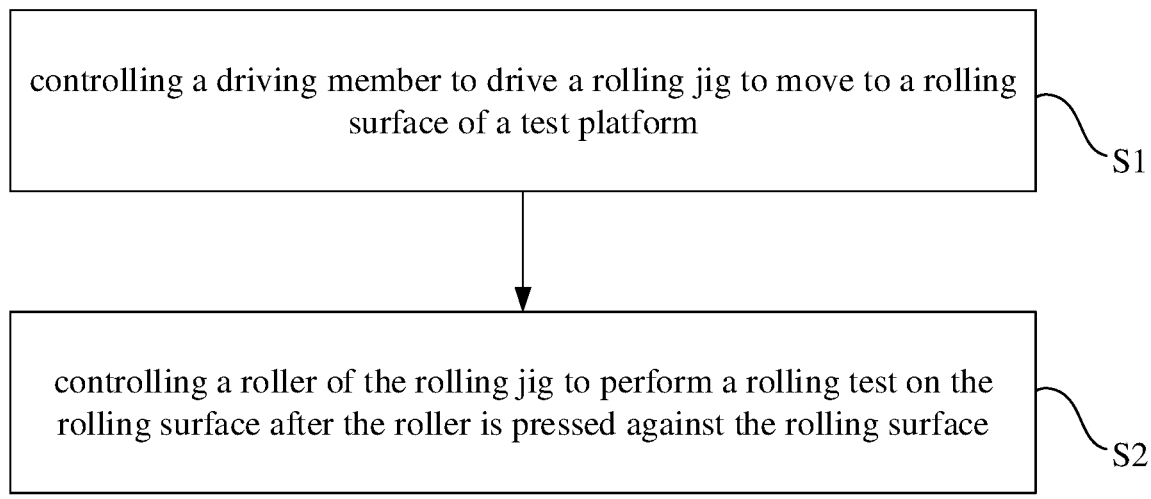
FIG. 4 is a flowchart of the operations of a rolling test method according to an embodiment of the present disclosure.
Figure 5:
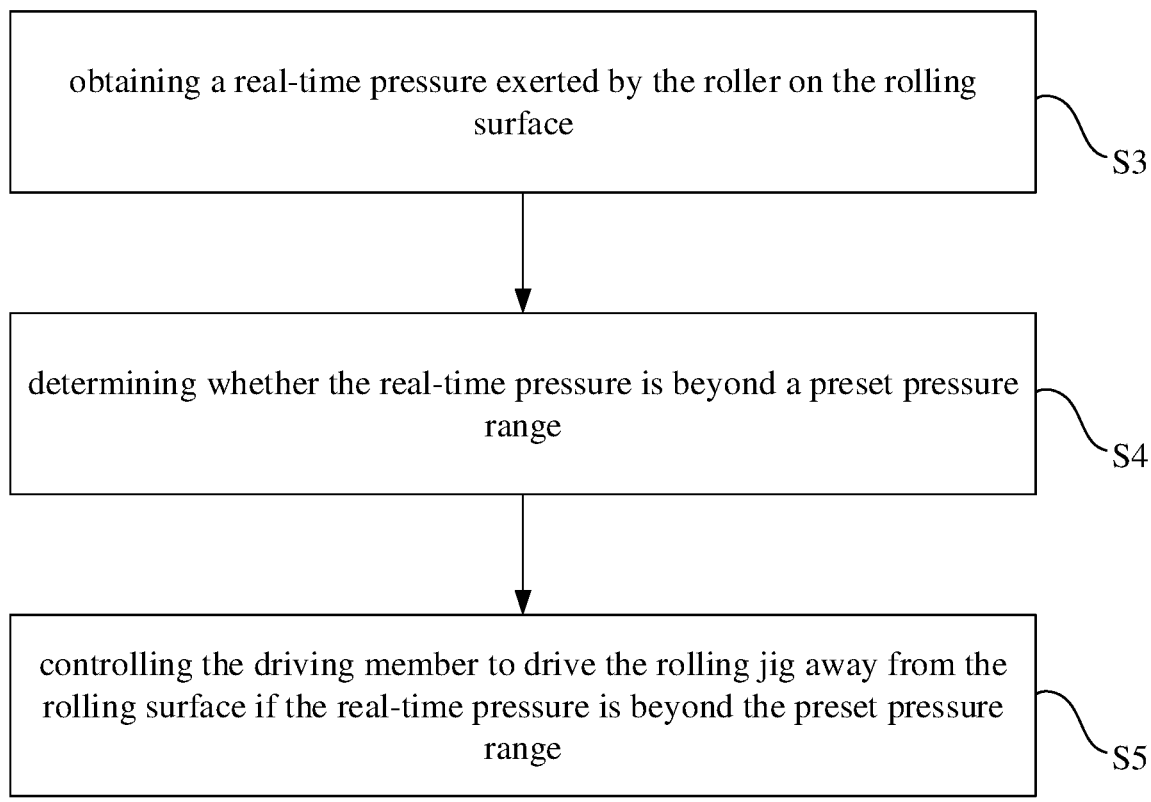
FIG. 5 is a flowchart of the operations of the rolling test method according to another embodiment of the present disclosure.
Figure 6:
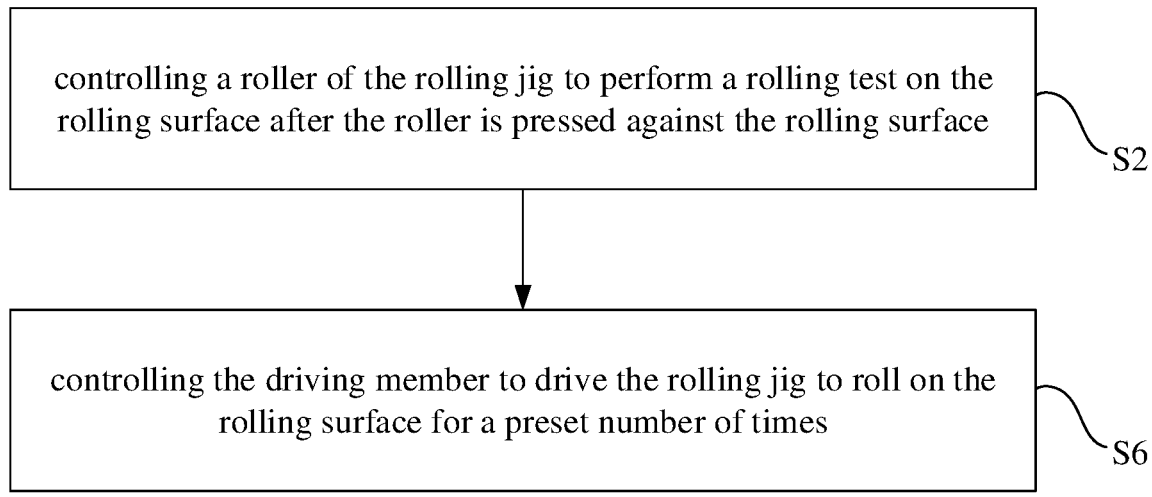
FIG. 6 is a flowchart of the operations of the rolling test method according to still another embodiment of the present disclosure.

As shown in FIG. 4 to FIG. 6, the present disclosure further provides a rolling test method.

The rolling test method is based on the rolling test device described in the above embodiments, and the rolling test device is shown in FIG. 1 to FIG. 3. Specially, the rolling test device includes a test platform 1, a rolling jig 2, and a driving member 3. The test platform 1 has a rolling surface 11 for placing a test piece 4 to be rolled. The rolling jig 2 is located on one side of the rolling surface 11. A roller 21 is connected to one end of the rolling jig 2 towards the rolling surface 11. After the roller 21 is pressed against the rolling surface 11, the driving member 3 drives the rolling jig 2 to move on the rolling surface 11 to drive the roller 21 to perform a rolling test on the rolling surface 11.

In an embodiment, the test piece 4 to be rolled is a display panel. The display panel is placed on the rolling surface 11 of the test platform 1. The test piece 4 to be rolled is located between the rolling jig 2 and the test platform 1, that is, between the roller 21 and the rolling surface 11, such that the roller 21 can move on the test piece 4 to be rolled. That is, when the roller 21 is pressed against the test piece 4 to be rolled, the driving member 3 drives the rolling jig 2 to move on the test piece 4 to be rolled to drive the roller 21 to move on the test piece 4 to be rolled, thereby performing the rolling test on the test piece 4 to be rolled.

As shown in FIG. 4, FIG. 4 is a flowchart of the operations of the rolling test method according to an embodiment of the present disclosure. The rolling test method includes:

S1, controlling a driving member to drive a rolling jig to move to a rolling surface of a test platform.

In this operation, controlling a driving member 3 to drive a rolling jig 2 to move to a rolling surface 11 of a test platform 1.

In an embodiment, before performing the operation, the test piece 4 to be rolled needs to be placed on the rolling surface 11 of the test platform 1, that is, the driving member 3 is controlled to drive the rolling jig 2 to move to the test area of the test piece 4 to be rolled. In the present disclosure, the test area is the edge area of the test piece 4 to be rolled, that is, the edge area of the display panel.

In an embodiment, before performing the operation, the rolling test method further includes placing the backlight source 5 under the test piece 4 to be rolled, and turning on the backlight source 5, such that light of the backlight source 5 is irradiated on the test piece 4 to be rolled, thereby the test piece 4 to be rolled is illuminated, and the tester can monitor the test condition of the test piece 4 to be rolled in real time.

S2, controlling a roller of the rolling jig to perform a rolling test on the rolling surface after the roller is pressed against the rolling surface.

In this embodiment, when the roller 21 of the rolling jig 2 is pressed against the rolling surface 11, the roller 21 is controlled to perform a rolling test on the rolling surface 11. Since the roller 21 is provided at the end of the rolling jig 2 towards the rolling surface 11, when the test piece 4 to be rolled is placed on the rolling surface 11 and fixed in position, the driving member 3 drives the rolling jig 2 to move to the rolling surface 11, so that the roller 21 is pressed against the rolling surface 11, that is, the roller 21 is pressed against the test area of the test piece 4 to be rolled. In the present disclosure, the test area is the edge area of the test piece 4 to be rolled, that is, the edge area of the display panel. A pressure value is applied to the rolling jig 2 such that the roller 21 is pressed against the edge area of the test piece 4 to be rolled with the pressure value. The driving member 3 drives the rolling jig 2 to move on the edge area of the test piece 4 to be rolled to drive the roller 21 to perform a rolling test on the edge area of the test piece 4 to be rolled, thereby obtaining the limit value of the edge area of the test piece 4 to be rolled to resist pressure.

In an embodiment, the pressure value can be set by the pressure structure (not shown). That is, the pressing mechanism applies the required pressure value to the rolling jig 2 and applies the pressure value to the test piece 4 to be rolled through the roller 21 to realize the rolling test of the test piece 4 to be rolled. The roller 21 can be rolled back and forth on the test piece 4 to be rolled. That is, the roller 21 can be rolled multiple times on the test piece 4 to be rolled, and a starting position of the roller 21 to an end position of the test piece 4 to be rolled is one rolling of the roller 21. It is understandable that the pressure value of the roller 21 on the test piece 4 to be rolled is different each time. That is, the pressure value changes at any time with the increase of a rolling number of the roller 21. The change can be that the pressure value applied by the roller 21 increases with the increase of the rolling number of the roller 21. For example, the pressure value of the first rolling of the roller 21 is 2 kg, the pressure value of the second rolling pressure value is 4 kg, and the pressure value of the third rolling pressure value is 6 kg, until the limit value of the edge area of the test piece 4 to be rolled to resist pressure is obtained. However, in other embodiments, there may be other changing rules, which are not limited in the present disclosure.

In an embodiment of the present disclosure, the rolling test method includes controlling a driving member to drive a rolling jig to move to a rolling surface of a test platform; and controlling a roller of the rolling jig to perform a rolling test on the rolling surface after the roller is pressed against the rolling surface. As such, in technical solutions of the present disclosure, the test piece 4 to be rolled is placed on the rolling surface 11 of the test platform 1, such that the roller 21 is pressed against the test piece 4 to be rolled to perform a reciprocating rolling test on the test piece 4 to be rolled, thereby reducing the test cycle and improving the test efficiency.

As shown in FIG. 5, FIG. 5 is a flowchart of the operations of the rolling test method according to another embodiment of the present disclosure. After the operation S2, the rolling test method further includes:

S3, obtaining a real-time pressure exerted by the roller on the rolling surface.

In this operation, the real-time pressure exerted by the roller 21 on the rolling surface 11 can be obtained, that is, the real-time pressure exerted by the roller 21 on the rolling surface 11 on the test piece 4 to be rolled can be obtained during a specific rolling test.

S4, determining whether the real-time pressure is beyond a preset pressure range.

In this operation, according to the real-time pressure obtained in operation S3, it is determined whether the real-time pressure is beyond the preset pressure range. The preset pressure range is between 2 kg and 40 kg.

S5, controlling the driving member to drive the rolling jig away from the rolling surface if the real-time pressure is beyond the preset pressure range.

In this embodiment, the corresponding operation is performed according to the result of operation S4.

If the real-time pressure is beyond the preset pressure range, the driving member 3 is controlled to drive the rolling jig 2 away from the rolling surface 11. That is, the driving member 3 is controlled to drive the roller 21 of the rolling jig 2 away from the surface of the test piece 4 to be rolled.

If the real-time pressure is within the preset pressure range, the driving member 3 is controlled to drive the rolling jig 2 to move on the rolling surface 11. That is, the driving member 3 is controlled to drive the roller 21 of the rolling jig 2 to perform the rolling test on the test piece 4 to be rolled.

In an embodiment of the present disclosure, the rolling test method further includes obtaining a real-time pressure exerted by the roller on the rolling surface; determining whether the real-time pressure is beyond a preset pressure range; and controlling the driving member to drive the rolling jig away from the rolling surface if the real-time pressure is beyond the preset pressure range. As such, in technical solutions of the present disclosure, it is determined that the real-time pressure exerted by the roller 21 on the test piece 4 to be rolled is beyond the preset pressure range, and the driving roller 21 is moved away from the surface of the test piece 4 to be rolled, thereby avoiding that the test piece 4 to be rolled is instantly destroyed when the pressure is too high.

As shown in FIG. 6, FIG. 6 is a flowchart of the operations of the rolling test method according to another embodiment of the present disclosure. After the operation S2, the rolling test method further includes:

S6, controlling the driving member to drive the rolling jig to roll on the rolling surface for a preset number of times.

In this operation, the driving member 3 is controlled to drive the rolling jig 2 to roll on the rolling surface 11 for a preset number of times. That is, the driving member 3 is controlled to drive the roller 11 on the rolling jig 2 to perform the rolling test on the test piece 4 to be rolled for a preset number of times.

In an embodiment, the preset number of times is at least 5.

In an embodiment, the roller 21 can be rolled back and forth on the test piece 4 to be rolled. That is, the roller 21 can be rolled multiple times on the test piece 4 to be rolled, and a starting position of the roller 21 to an end position of the test piece 4 to be rolled is one rolling of the roller 21. It is understandable that the pressure value of the roller 21 on the test piece 4 to be rolled is different each time. That is, the pressure value changes at any time with the increase of the rolling number of the roller 21. The change can be that the pressure value applied by the roller 21 increases with the increase of the rolling number of the roller 21. For example, the pressure value of the first rolling of the roller 21 is 2 kg, the pressure value of the second rolling is 4 kg, and the pressure value of the third rolling is 6 kg, until the limit value of the edge area of the test piece 4 to be rolled to resist pressure is obtained. However, in other embodiments, there may be other changing rules, which are not limited in the present disclosure.

In an embodiment of the present disclosure, the rolling test method further includes controlling the driving member to drive the rolling jig to roll on the rolling surface for a preset number of times. As such, in technical solutions of the present disclosure, the obtained limit value of the edge area of the test piece 4 to be rolled to resist pressure is more accurate through multiple rolling.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A rolling test device, comprising:
a test platform having a rolling surface for placing a test piece to be rolled;
a rolling jig located on one side of the rolling surface;
a driving member connected to the rolling jig; and
a backlight source for illuminating the test piece to be rolled;
wherein a roller is connected to one end of the rolling jig towards the rolling surface, after the roller is pressed against the rolling surface, the driving member drives the rolling jig to move on the rolling surface to drive the roller to perform a rolling test on the rolling surface.

2. The rolling test device of claim 1, wherein a rolling direction of the roller is parallel to a first direction.

3. The rolling test device of claim 1, wherein a portion of the test piece to be rolled is placed on the rolling surface, and another portion of the test piece to be rolled extends out of the test platform.

4. The rolling test device of claim 1, wherein:
the rolling jig includes a connecting plate, a mounting seat and a cardan shaft;
the mounting seat is movably connected to the connecting plate through the cardan shaft;
an output end of the driving member is connected to one end of the connecting plate away from the mounting seat; and
the roller is connected to one end of the mounting seat away from the connecting plate.

5. The rolling test device of claim 4, wherein the driving member is a stepping motor.

6. The rolling test device of claim 4, wherein the rolling jig further includes a fixing plate mounted on the connecting plate and provided between the cardan shaft and the connecting plate.

7. The rolling test device of claim 4, wherein the rolling jig further includes a fixing pin for fixing the roller on the mounting seat.

8. The rolling test device of claim 1, further comprising a protective member between the roller and the rolling surface.

9. The rolling test device of claim 8, wherein the protective member is a rubber gasket.

10. The rolling test device of claim 8, wherein a length of the protective member is equal to a length of an edge area of the test piece to be rolled.

11. The rolling test device of claim 8, wherein a width of the protective member is equal to a thickness of the roller.

12. A rolling test method, comprising the following operations:
controlling a driving member to drive a rolling jig to move to a rolling surface of a test platform; and
controlling a roller of the rolling jig to perform a rolling test on the rolling surface after the roller is pressed against the rolling surface;
obtaining a real-time pressure exerted by the roller on the rolling surface;
determining whether the real-time pressure is beyond a preset pressure range; and
controlling the driving member to drive the rolling jig away from the rolling surface if the real-time pressure is beyond the preset pressure range.

13. The rolling test method of claim 12, wherein the preset pressure range is between 2 kg and 40 kg.

14. A rolling test method, comprising the following operations:

controlling a driving member to drive a rolling jig to move to a rolling surface of a test platform; and controlling a roller of the rolling jig to perform a rolling test on the rolling surface after the roller is pressed against the rolling surface; and controlling the driving member to drive the rolling jig to roll on the rolling surface for a preset number of times.

15. The rolling test method of claim 14, wherein the preset number of times is at least 5.

* * * * *